United States Patent [19]

Vass et al.

[11] Patent Number: 5,415,929
[45] Date of Patent: May 16, 1995

[54] MAGNETIC RECORDING MEDIUM HAVING A MAGNETIC LAYER PREPARED FROM MAGNETIC PARTICLES USING SPECIFIED DISPERSANTS WHICH ENHANCE THE ELECTROSTATIC CHANGE ON THE MAGNETIC PIGMENT SURFACE

[75] Inventors: Attila Vass; Wolf-Dieter Schroeer, both of Munich; Hans-Heinrich Credner, Hohenschaeftlarn, all of Germany

[73] Assignee: BASF Magnetic GmbH, Mannheim, Germany

[21] Appl. No.: 53,864

[22] Filed: Apr. 29, 1993

[30] Foreign Application Priority Data

Apr. 30, 1992 [DE] Germany .................. 42 14 276.8

[51] Int. Cl.$^6$ .................................... G11B 5/00
[52] U.S. Cl. .................. 428/323; 428/403; 428/407; 428/694 BA; 428/900
[58] Field of Search ............ 428/694 BA, 900, 323, 428/403, 407

[56] References Cited

U.S. PATENT DOCUMENTS

| | | | |
|---|---|---|---|
| 3,003,965 | 10/1961 | Troelstra et al. | 252/62.5 |
| 3,647,539 | 3/1972 | Weber | 117/235 |
| 4,073,977 | 2/1978 | Koester et al. | 427/216 |
| 4,533,565 | 8/1985 | Okita | 427/44 |
| 5,069,931 | 12/1991 | Gerum et al. | 427/128 |
| 5,142,001 | 8/1992 | Yasuda et al. | 525/453 |
| 5,158,830 | 10/1992 | Yasuda et al. | 428/425.9 |

OTHER PUBLICATIONS

Fowkes et al., "Mechanism of Electric Charging ... ", *Am. Chem. Soc.* 1982, pp. 307–324.
Fowkes et al., "Steric and Electrostatic ... ", *Am. Chem Soc.*, vol. 240 1984, pp. 331–354.
Fowkes, *Adv. in Ceramics*, vol. 21, 1987, "Dispersions of Ceramic ... ".
Fowkes, *J. Adhesion Sci. Tech.*, vol. 1, No. 1, pp. 7–27, 1987.

*Primary Examiner*—Stevan A. Resan
*Attorney, Agent, or Firm*—Keil & Weinkauf

[57] ABSTRACT

In the preparation of dispersions of magnetic pigments in organic solvents, dispersants which have a sterically stabilizing effect are used. Milling results in division of the pigment aggregates, which combine again as a result of attractive forces to give secondary agglomerates in the event of poor stabilization. These flocculating materials must be removed from the dispersion by expensive filtration. If an increase in the fineness or pigment batch fluctuations lead to an increase in the secondary agglomerates, filter breakthroughs may occur, resulting in a dramatic reduction in the yield of magnetic recording medium. It was found that excellent dispersion stability is achieved when the magnetic pigments are first precoated with a long-chain dispersant. Subsequently, the use of charge-generating, low molecular weight codispersants, a charge build-up on the pigment is specifically induced by means of bases or acids. The electrostatic repulsion which additionally becomes effective leads to an increase in the dispersion stability. The charges on the pigment are monitored by means of ESA measurements (electrokinetic sound amplitude). These ESA measurements make it possible to establish the order of addition of the dispersants and the optimum amount of codispersant.

4 Claims, No Drawings

MAGNETIC RECORDING MEDIUM HAVING A MAGNETIC LAYER PREPARED FROM MAGNETIC PARTICLES USING SPECIFIED DISPERSANTS WHICH ENHANCE THE ELECTROSTATIC CHANGE ON THE MAGNETIC PIGMENT SURFACE

The present invention relates to a magnetic recording medium consisting of a nonmagnetic substrate and at least one magnetic dispersion applied thereon and containing finely divided magnetic pigments, which are dispersed in a polymeric binder, and dispersants.

The development of magnetic recording media has for many years been directed toward achieving higher recording density and improved signal/noise ratio. To improve these properties, the pigment concentration of the magnetic layer must be increased and good surface smoothness must be achieved by improving the dispersing and the orientation of the finely divided magnetic pigments, which must have excellent magnetic properties.

A further requirement of magnetic recording media having high recording density is a layer which is free of interfering particles. This can be achieved on the one hand only with magnetic dispersions which contain no agglomerates. On the other hand, the magnetic dispersion must be filtered using filters having an extremely small pore size (about 5 $\mu$m).

In order to obtain the desired dispersion properties, it is essential to use certain binders which have both good binding properties and good dispersion properties for the magnetic pigment. Such dispersant compounds are referred to below as dispersing resins. In the magnetic dispersions, a certain proportion of the polymeric binder, from 2 to 100%, is replaced with active high molecular weight or low molecular weight dispersing resins which have a very good affinity to the finely divided magnetic pigment. Here, the dispersing resins are understood as meaning chemical compounds which are obtained from monomer building blocks by polymerization, polycondensation or polyaddition and which contain at least one polar group suitable for adsorption onto the surface of the magnetic pigment. However, the viscosity of the magnetic dispersion may consequently be increased to an extremely great extent, resulting in difficulties which are all the greater the more finely the magnetic pigment and which are described in detail below.

In particular, magnetic dispersions which contain finely divided pigments having a BET value of more than 35 m$^2$/g as magnetic pigment can, together with the conventional formulation components, such as polymeric binders, have a high flow limit and can therefore be filtered only with difficulty and using special filtration units, particularly if the magnetic dispersion stands for a long time during production, which can easily occur, for example, during a stoppage in production. If an increase in fineness or pigment batch fluctuations leads to an increase in the secondary agglomerates, filter breakthrough may occur, resulting in a dramatic reduction in the yield of tape material.

There has been no lack of attempts to achieve the required homogeneity of the dispersion.

A certain degree of homogeneity can be achieved by thorough milling of the magnetic dispersion, but interlocking or sintering of the pigment agglomerates to different extents results in the more readily dividable pigment fraction being already highly overmilled before the sintered pigment needle fraction has been sufficiently comminuted. Particularly in the case of metal pigments, the surface layer which provides stabilization against oxidation may be destroyed.

German Laid-Open Application DOS 3,905,910 proposes adding dispersant during the fine dispersing of the magnetic dispersion in a plurality of stages at the rate at which new pigment surface is continuously formed by the dispersing process. DE 10 05 754 discloses that certain phosphoric esters can be added to reduce the viscosity of the dispersion produced using conventional binders. Furthermore, German Laid-Open Application DOS 2,535,277 and U.S. Pat. No. 4,533,565 disclose that the surface of the magnetic pigments can be coated with certain compounds, such as polymerizable alkylene oxides or compounds having polar groups, before they are added to the magnetic dipersion. DE 22 50 384 describes alkylarylsulfonic acids, alone or as a mixture with phosphoric esters or with alkoxylated alkylphenols, as dispersants for a magnetic recording medium which contains $CrO_2$ as magnetic pigment.

German Application P 40 34 747 describes low molecular weight mono- or diesters of phosphoric acid which are used in combination with a dispersing resin, the latter containing at least one polar group capable of adsorption onto the magnetic pigment.

Several publications by F. M. Fowkes, in particular Colloids and Surfaces in Reprographic Technology, ACS Symposium Series 200, Am. Chem. Soc. (1982), 307, Polymer Adsorption and Dispersion Stability, ACS Symposium Series 240, Am. Chem. Soc. (1984), 331, Ceramic Powder Science and Technology; Advances in Ceramics, 21 (1987), 411, J. Adhesion Sci. Techn., 1 (1987), No. 7, disclose that the electrostatic repulsion helps to stabilize dispersions in organic media. For this purpose, there must be an ionic interaction between the dispersant and the surface (acid-base interaction), and an excess of non-adsorbed dispersant leads to charge generation on the pigment surface. The corresponding acids or bases formed, solvated as a diffuse ionic layer, stabilize the charge build-up on the pigments. On the other hand, any skilled worker in the magnetic sector knows that an excess of nonadsorbed dispersant has adverse effects on the mechanical, magnetic and storage properties of the magnetic recording media.

It is an object of the present invention to provide a magnetic recording medium of the generic type stated at the outset, in which, during the preparation of the dispersion, an optimum uniform charging of the pigment surfaces and hence an increase in the dispersion stability, a lower flow limit and a flatter $\tau$-D curve (shear stress/shear rate) are obtained, resulting in good mechanical and magnetic properties of the recording medium.

We have found that this object is achieved, according to the invention, by a magnetic recording medium consisting of a nonmagnetic substrate and at least one magnetic dispersion applied thereon and containing finely divided magnetic pigments, which are dispersed in a polymeric binder, and dispersants, comprising precoating of the magnetic pigments with at least one long-chain dispersant having a sterically stabilizing effect and selected from the group consisting of lecithins, diamines, phosphoric esters and polyalkylene oxides having at least one polar group capable of adsorption onto the pigment, and subsequent addition of at least one low molecular weight codispersant selected from the group consisting of solvated acids or bases, the amount of which is sufficient for enhancing the electrostatic charge on the pigment surface. Further details of the invention are evident from the subclaims and the description.

The essential feature of the invention is that the surface of the magnetic pigments is first coated with a long-chain dispersant having a sterically stabilizing effect and, in a second step, a low molecular weight codispersant, selected from solvatizable acids or bases, is added to the magnetic dispersion, the amount of the codispersant being such that it results in charge enhancement on the pigment surface.

The choice of the dispersant having a sterically stabilizing effect and of the codispersant depends on whether the magnetic pigments have a large number of acidic or basic surface groups.

If the pigments are magnetic pigments such as $CrO_2$ or $\gamma\text{-}Fe_2O_3$, the magnetic pigments are preferably precoated with long-chain basic or amphoteric dispersants, for example with lecithins and/or alkylated or ethoxylated amines, in particular tertiary amines, diamines or polyamines. In a second stage, solvatizable bases, for example quaternary ammonium compounds, in particular tetra-n-alkylammonium hydroxide, pentaalkylguanidine, pentaisoalkylguanidine, where suitable alkyl groups are methyl to octyl, or 1,2,2,6,6-pentamethylpiperidine, ethanolic KOH solution or others, are added as low molecular weight codispersants.

The following are also suitable: metal alkoxylates, for example aluminum sec-butylate, aluminum tert-butylate, aluminum ethylate, aluminum isopropylate, potassium tert-butylate, potassium ethylate, potassium methylate, sodium ethylate, sodium methylate and sodium tert-amylate Grignard compounds, for example methylmagnesium chloride, methylmagnesium iodide and methylmagnesium bromide metal hydrides, in particular sodium borohydride ($NaBH_4$), sodium tetrahydridoborate (sodium boronate) or the corresponding Li or K compounds, lithium aluminumhydride ($LiAlH_4$), lithium tetrahydridoaluminate (lithium alanate), LiH, NaH, KH in oil, lithium hydride as a suspension, $NaNH_2$ in toluene as a suspension (sodium amide), $LiNH_2$, potassium tri-sec-butylborohydride or K selectrides.

In the case of magnetic pigments having a basic surface, for example ferrites, in particular Co ferrites, and metal pigments having an oxidic surface, for example an $Al_2O_3$ layer or an $MeSiO_3$ layer or mixtures thereof, phosphoric esters, such as Gafac or Lutensite which are known from the prior art, or a polyalkylene oxide acrylate containing carboxylic acid are suitable as long-chain dispersants in addition to the abovementioned combination, also for precoating. Other suitable codispersants are solvatizable acids, such as HCl, $HClO_4$, or short-chain phosphonic or sulfonic acids, or diethylhexyl phosphate or dibutyl phosphate.

The codispersants are chosen on the basis of the ESA signal determined, as explained further below. The higher the absolute value of the ESA signal, the more effective are the codispersants, and this depends, inter alia, on their dissociation power in the subsequent organic solvents. The optimized amount of codispersant can be determined by titrating the dissolved codispersant in the magnetic pigment suspension. The amount chosen is that for which the maximum ESA value is obtained, this generally covering a relative large concentration range for the codispersant.

Examples of binders for the novel magnetic recording media are copolymers of vinyl chloride, vinyl acetate and vinyl alcohol, copolymers of vinylidene chloride and acrylonitrile, polyvinyl acetals, such as polyvinyl formals, polyester/polyurethanes, polycarbonate/polyurethanes, polyurethane elastomers or polyether elastomers, phenoxy or epoxy resins, as well as mixtures thereof and the abovementioned dispersing resins.

Examples of solvents which may be used for all abovementioned polymeric binders are tetrahydrofuran, dioxane, dimethylformamide, cyclohexanone, methyl ethyl ketone, toluene, methyl isobutyl ketone and others, if necessary also as a mixture.

Of course, the stated dispersant may also be combined with other dispersants, for example cephalin, fatty amines or fatty diamines, fatty amides or fatty diamides, fatty acids or ammonium salts thereof, ethoxylated fatty acid derivatives, aliphatic or aromatic phosphoric esters which may be ethoxylated, sulfosuccinic esters, sorbitan esters, sulfonates, fatty alcohol sulfates and others.

Further formulation components may be used, depending on the desired properties of the dispersion or of the prepared layer. Lubricants, for example fatty acids or fatty acid derivatives, silicone oils, paraffins, waxes, fluorinated oils and dispersions of polytetrafluoroethylene, are particularly suitable. Examples of possible additives are plasticizers, abrasives, crosslinking agents and if required crosslinking catalysts, viscosity regulators and others.

After the novel precoated and predispersed pigments have been introduced into the dispersion, the batch is homogenized in a mixing apparatus under high shear forces, which can be achieved, for example, in a kneader, a colloid mill, a ball mill or an attritor. This is followed by fine dispersing with the addition of the codispersant, for example in a sand mill whose milling intensity can be controlled by varying the grinding medium size and load, the speed and the coating throughput.

The subsequent coating of the nonmagnetic substrate with the magnetic dispersion is effected according to the prior art, for example by means of a reverse-roll coater, a doctor blade or an extrusion coater.

The substrates used may be films of polyester, such as polyethylene terphthalate, polyolefins, such as polypropylene, cellulose derivatives, such as triacetate, polycarbonates or rigid substrates of nonmagnetic metals, such as aluminum, or ceramic materials.

The further processing of the coated materials, such as surface smoothing by calendering, slitting and finishing, is carried out in a known manner.

The order of addition and the amount of dispersants used for precoating the pigment surface and the subsequent use of the codispersants are described in the Examples.

As described above, a charge build-up on the magnetic pigment is specifically effected by the use of charge-generating low molecular weight codispersants consisting of solvatizable bases or acids. The electrostatic repulsion of magnetic pigments which thus also becomes effective leads to a considerable increase in the dispersion stability.

In the present invention, it has been found that the charges on the magnetic pigment can be monitored by means of ESA measurement (electrokinetic sound amplitude), in order thus to establish the optimum amount of codispersant. The principle of the ESA measurement is based on the fact that two electrodes are fed with a high frequency AC voltage, preferably 1 MHz, from a power generator. The charged dispersed particles and their oppositely charged environment are accelerated to different extents in the alternating electric field owing to their different inertias. This leads to a predominantly one-sided solvent uptake and hence the build-up of a pressure wave whose frequency corresponds to the AC voltage frequency. The greater the charge of the dispersed particles, the greater is the effect, since the accelerating force in the electric field increases with the particle charge. The stability and absorption properties of concentrated dispersions depend substantially on the net surface charge of the dispersed magnetic pigments.

A suitable apparatus for measuring the ESA is sold by Matec Instruments Inc., USA. A dispersion consisting of 2% by weight of magnetic pigment, which had been precoated according to the invention with a long-chain dispersant and mixed with a low molecular weight codispersant, was dispersed in 100 parts by weight of the solvent tetrahydrofuran between the electrodes of the apparatus. It was found that sufficient charge generation was achieved on the magnetic pigment and accordingly a very good dispersion stability was obtained if the ESA measurement described gave an absolute value of at least 10 $\mu Pa \times m \times volt^{-1}$, measured at 1 MHz Accordingly, the amount of codispersant added, which can be very small, was controlled so that the above value was reached or exceeded, as is evident from the Examples below. The sign of the resulting value of the ESA measurement is positive or negative, depending on the sign of the generated charge on the pigment surface.

EXAMPLES 1 TO 8

A magnetic dispersion having the following composition 1 was prepared, stirring being carried out for 30 minutes after the addition of dispersant 1, and the codispersant and the further additives then being introduced and fine milling being effected for 6 hours in a stirred ball mill in the presence of ceramic grinding media having a diameter of 0.6–0.8 mm. Thereafter, a) the ESA value of the dispersion and the rheological data ($\tau p$, $\tau 500$) were measured as described above. $\tau P$ is the flow limit (Pa). $\tau 500$ is the shear stress (Pa) measured at a shear rate of 500 $s^{-1}$.

b) A wet coating having a wet layer thickness of 50 $\mu m$ on a glass sheet was measured optically to determine the gloss.

| Composition 1 | Parts by weight |
| --- | --- |
| $CrO_2$ (BET = 30 $m^2/g$, $_jH_c$ = 52 $kA/m^2$) | 100 |
| Dispersant(s) 1 | 2.8 |
| Codispersant | 0.15 |
| Vinyl chloride copolymer | 3.4 |
| Solvent (tetrahydrofuran, cyclohexanone) | 119 |

Table 1 shows the results, Examples 2, 4, 6 and 8 having the novel composition while Examples 1, 3, 5 and 7 are Comparative Examples which do not correspond to the present invention.

TABLE 1

| Example | Dispersant 1 | Codispersant | ESA [$\mu$Pa m/V] | Gloss (scale division) measured at 20° C. | 60° C. | $\tau p$ [Pa] | $\tau 500$ [Pa] |
| --- | --- | --- | --- | --- | --- | --- | --- |
| 1 (Comp.) | L | | −8 | 162 | 148 | 29.1 | 50.1 |
| 2 | L | B | −57 | 159 | 148 | 19.5 | 33.0 |
| 3 (Comp.) | ED | | −2 | 59 | 110 | 35 | 57 |
| 4 | ED | B | −20 | 86 | 121 | 15 | 26 |
| 5 (Comp.) | AD | | −2 | 99 | 132 | 40.1 | 51.0 |
| 6 | AD | B | −28 | 111 | 135 | 15.9 | 26.9 |
| 7 (Comp.) | ED, AD | | −4 | 123 | 139 | 10.3 | 17.9 |
| 8 | ED, AD | B | −23 | 124 | 138 | 9.5 | 16.7 |

The symbols have the following meanings:
L = Highly purified lecithin
B = Tetra-n-butylammonium hydroxide
ED = Ethoxylated alkylpropylenediamine
AD = Alkylpropylenediamine

EXAMPLES 9–14

A magnetic dispersion having the composition 2 stated below was prepared as described above.

Thereafter, the dispersion was filtered through fine Pall profile filters having a pore size of 5 $\mu m$ and was cast in an extrusion coater onto a 15.2 $\mu m$ thick 66 cm wide polyethylene terephthalate film to give a dry layer thickness of 2.3 $\mu m$, and the layer was dried and then calendered. The pigment volume concentration was 48%.

The magnetic recording medium was slit longitudinally to a half inch width and the relevant mechanical and magnetic characteristics of the magnetic layer were measured. The results are shown in Table 2.

| Composition 2 | Parts by weight |
| --- | --- |
| $CrO_2$ | 85 |
| Co-doped $\gamma$-$Fe_2O_3$ | 15 |
| Polyester/polyurethane (molecular weight 80,000) | 14.1 |
| Vinyl chloride copolymer | 6.1 |
| Diisocyanate | 3.3 |
| Dispersant 1 | 2.4 |
| Codispersant | 0.15 |
| Fatty acid | 0.6 |
| Fatty ester | 0.8 |
| Solvent (tetrahydrofuran, cyclohexanone) | 209 |

TABLE 2

| Example | Dispersant 1 | Codispersant | ESA μPam v | Gloss Scale divisions 60° | Roughness $R_z$ (nm) | $\frac{M_R}{M_S}$ | $\frac{S}{N}$ (L) (db) | FSM (db) | S/N (Chroma) |
|---|---|---|---|---|---|---|---|---|---|
| 9 | L | — | −9 | 130 | 85 | 0.83 | Comp. | Comp. | Comp. |
| 10 | L | B | −38 | 141 | 71 | 0.85 | +0.7 | +0.7 | +1.5 |
| 11 | L | B | −32 | 145 | 109 | 0.86 | +0.8 | +1.2 | +1.7 |
| 12 | ED | B | −20 | 149 | 82 | 0.82 | +0.7 | | +0.9 |
| 13 | ED | B | −15 | 134 | 96 | 0.82 | +0.1 | +0.1 | +0.3 |
| 14 | ED, AD | B | −23 | 157 | 76 | 0.83 | +2.6 | +3.5 | +2.2 |

Example 9 (Comparative Example) does not have the novel composition, whereas all other Examples 10–14 correspond to the present invention.

EXAMPLES 15–17

A magnetic dispersion having the following composition 3 was prepared as described above.

| Composition 3 | Parts by weight |
|---|---|
| Co ferrite (BET 42 m²/g, $_j$H$_c$, 54 kA/m) | 100 |
| Vinyl chloride copolymer | 6 |
| Polyester/polyurethane | 14 |
| Diisocyanate | 3.3 |
| Dispersant 1 | 4 |
| Codispersant | 0.15 |
| Fatty acid | 0.6 |
| Fatty ester | 0.8 |
| Solvent (tetrahydrofuran) | 180 |

The dispersion was further processed as described in Example 1–8 and gave the results shown in Table 3.

TABLE 3

| Example | Dispersant 1 | Codispersant | ESA [μPa m/V] | Gloss (scale divisions) measured at 20° | 60° | τp [Pa] | τ500 [Pa] |
|---|---|---|---|---|---|---|---|
| 15 | AD | B | −70 | 129 | 118 | 39 | 53 |
| 16 | AD | G | −22 | — | — | — | — |
| 17 | AD | P | −19 | — | — | — | — |

The symbols have the following meanings:
G = Pentaalkylguanidine
P = 1,2,2,6,6-Pentamethylpiperidine

EXAMPLE 18

A magnetic dispersion having composition 4 is prepared as described above and further processed as in Examples 1–8.

| Composition 4 | Parts by weight |
|---|---|
| Fe pigment (BET 56 m²/g, $_j$H$_c$, 120 kA/m) | 100 |
| Polyester/polyurethane | 8 |
| Vinyl chloride copolymer | 8 |
| Diisocyanate | 2 |
| Dispersant 1 (AD) | 2.0 |
| Codispersant (B) | 0.2 |
| Fatty acid mixture C 14–C 18 | 2 |
| Solvent (tetrahydrofuran) | 250 |

The dispersion gave the following results:

| ESA (μPa m/V) | Gloss (scale divisions) 20° | 60° | τp (Pa) | τ500 (Pa) |
|---|---|---|---|---|
| −50 | 115 | 110 | 29 | 60 |

We claim:

1. A magnetic recording medium consisting of a nonmagnetic substrate and at least one dried magnetic dispersion layer applied therein, said magnetic dispersion containing milled magnetic pigments, which are dispersed in a polymeric binder, and dispersants, comprising precoating of the magnetic pigments with at least one long-chain dispersant having a sterically stabilizing effect and selected from the group consisting of lecithins, diamines, phosphoric esters and polyalkylene oxides having at least one polar group capable of adsorption onto the pigment, and subsequent addition of at least one low molecular weight codispersant selected from the group consisting of solvated acids or bases, the amount of which is sufficient for enhancing the electrostatic charge on the pigment surface.

2. The magnetic recording medium of claim 1, wherein precoating of the magnetic pigment is effected by means of lecithins or alkylated or ethoxylated diamines, and the codispersant is selected from the group consisting of tetra-n-alkylammonium hydroxide, pentaalkylguanidine, pentaisoalkylguanidine, piperidine, ethanolic KOH solution, metalalkoxylates, Grignard compounds and metal hydrides.

3. The magnetic recording medium of claim 1, wherein surface precoating is effected by means of long-chain phosphoric esters or polyalkylene oxide acrylate containing carboxylic acid, and the codispersant is selected from the group consisting of HCl, HClO$_4$, short-chain sulfonic acids, short-chain phosphonic acids, diethylhexyl phosphate and dibutyl phosphate.

4. The magnetic recording medium of claim 1, wherein the amount of codispersant is such that the ESA measurement gives an absolute value of at least 10 mPa.s × m × volt$^{-1}$, measured at 1 MHz in a dispersion consisting of 2% by weight, based on 100 parts by weight of solvent, of magnetic pigment.

* * * * *